United States Patent
Leclercq et al.

(10) Patent No.: US 8,531,333 B2
(45) Date of Patent: Sep. 10, 2013

(54) INTERMITTENT TRACKING FOR GNSS

(75) Inventors: Maxime Leclercq, Encinitas, CA (US); Ioannis Spyropoulos, La Jolla, CA (US); Anand K. Anandakumar, Carlsbad, CA (US); Curtis Ling, Carlsbad, CA (US)

(73) Assignee: Maxlinear, Inc., Carlsbad, CA (US)

(*) Notice: Subject to any disclaimer, the term of this patent is extended or adjusted under 35 U.S.C. 154(b) by 84 days.

(21) Appl. No.: 12/965,805

(22) Filed: Dec. 10, 2010

(65) Prior Publication Data

US 2011/0309976 A1 Dec. 22, 2011

Related U.S. Application Data

(60) Provisional application No. 61/285,512, filed on Dec. 10, 2009.

(51) Int. Cl.
  *G01S 19/34* (2010.01)
  *G01S 19/09* (2010.01)
(52) U.S. Cl.
  USPC .............................. 342/357.74; 342/357.46
(58) Field of Classification Search
  USPC ............ 342/357.25, 357.46, 357.71, 357.74; 701/468, 490
  See application file for complete search history.

(56) References Cited

U.S. PATENT DOCUMENTS

| | | | |
|---|---|---|---|
| 6,219,564 B1 | 4/2001 | Grayson et al. | |
| 6,985,811 B2 | 1/2006 | Gronemeyer | |
| 7,474,260 B2 | 1/2009 | Chen | |
| 7,500,125 B2 | 3/2009 | Yasumoto | |
| 7,551,126 B2 | 6/2009 | Loomis et al. | |
| 7,852,262 B2 | 12/2010 | Namineni et al. | |
| 7,925,274 B2 | 4/2011 | Anderson et al. | |
| 2003/0058834 A1 | 3/2003 | Soulie et al. | |
| 2004/0259571 A1 | 12/2004 | Joshi | |
| 2005/0195105 A1 | 9/2005 | McBurney et al. | |
| 2005/0233748 A1 | 10/2005 | Robinson et al. | |
| 2007/0001903 A1 | 1/2007 | Smith et al. | |
| 2008/0186166 A1 | 8/2008 | Zhou et al. | |
| 2009/0295631 A1 | 12/2009 | Wu et al. | |

(Continued)

FOREIGN PATENT DOCUMENTS

| | | |
|---|---|---|
| WO | WO 98/59446 A1 | 12/1998 |
| WO | 2011/072273 A1 | 6/2011 |
| WO | WO 2011/066473 A1 | 6/2011 |
| WO | 2011/137392 A1 | 11/2011 |

OTHER PUBLICATIONS

Non-Final Office Action for U.S. Appl. No. 12/954,603, mailed on Jun. 18, 2012; 13 pages.

(Continued)

*Primary Examiner* — Dao Phan
(74) *Attorney, Agent, or Firm* — Kilpatrick Townsend & Stockton LLP; Ardeshir Tabibi

(57) ABSTRACT

A GNSS system operates intermittently and has adaptive activity and sleep time in order to reduce power consumption. The GNSS system provides an enhanced estimate of its position in the absence of GNSS signals of sufficient strength. The user's activity and behavior is modeled and used to improve performance, response time, and power consumption of the GNSS system. The user model is based, in part, on the received GNSS signals, a history of the user's positions, velocity, time, and inputs from other sensors disposed in the GNSS system, as well as data related to the network. During each activity time, the GNSS receiver performs either tracking, or acquisition followed by tracking. The GNSS receiver supports both normal acquisition as well as low-power acquisition.

30 Claims, 1 Drawing Sheet

(56) References Cited

U.S. PATENT DOCUMENTS

2009/0322601 A1   12/2009   Ladd et al.
2011/0025557 A1   2/2011    Wang
2011/0187591 A1   8/2011    Walker
2011/0291882 A1   12/2011   Walsh et al.
2012/0105277 A1   5/2012    Ling et al.

OTHER PUBLICATIONS

International Preliminary Report on Patentability and Written Opinion for Application No. PCT/US2010/058120, mailed on Jun. 7, 2012, 8 pages.

International Preliminary Report on Patentability and Written Opinion for Application No. PCT/US2010/059974, mailed on Jun. 21, 2012, 8 pages.

International Search Report of the International Searching Authority for Application No. PCT/US2010/059974, mailed on Feb. 15, 2011, 22 pages.

Written Opinion of the International Searching Authority for Application No. PCT/US2010/059974, 6 pages.

International Search Report and Written Opinion for Application No. PCT/US2010/058120, mailed on Jan. 21, 2011, 15 pages.

International Search Report and Written Opinion for Application No. PCT/US2011/034668, mailed on Aug. 25, 2011, 13 pages.

INTERMITTENT TRACKING FOR GNSS

CROSS-REFERENCES TO RELATED APPLICATIONS

The present application claims benefit under 35 USC 119 (e) of U.S. provisional application No. 61/285,512, filed Dec. 10, 2009, entitled "Intermittent Tracking for GNSS," the content of which is incorporated herein by reference in its entirety.

BACKGROUND OF THE INVENTION

The present application is related to wireless communication systems, and more particularly to tracking and positioning operations of GNSS systems.

A GNSS systems, such as a GPS system, often includes a module which continuously tracks an object's movement and reports its position to facilitate navigation. Conventional GNSS tracking devices require relatively high power to support intermittent tracking applications. In battery powered devices, such as digital cameras that have tracking capability to tag the pictures with their corresponding locations, low power consumption is highly desirable.

BRIEF SUMMARY OF THE INVENTION

A GNSS receiver, in accordance with one embodiment of the present invention includes, in part, a position calculation and reporting module, and a tracking and acquisition module. The GNSS receiver is adapted to enter a low-power mode following each tracking phase or following each acquisition and tracking phase. The GNSS receiver is further adapted to exit the low-power mode in response to instructions from a control unit to calculate the position of the GNSS receiver. The GNSS receiver and reenters the low-power mode after the position of the GNSS receiver is calculated. The position calculation and reporting module reports the position of the GNSS receiver only in response to instructions from the control unit.

In one embodiment, if the duration of the low-power mode is such that an estimate of the corresponding local clock drift is less than a threshold value, only tracking operation is performed after exiting the low-power mode. If the duration of the low-power mode is such that an estimate of the corresponding local clock drift is greater than or equal to the threshold value, both acquisition and tracking operations are performed after exiting the low-power mode.

In one embodiment, the GNSS receiver is adapted to select between a normal acquisition phase and a low-power acquisition phase. During the low-power acquisition phase, a narrower range of frequency bins and code offsets is searched to reacquire satellite signals. In one embodiment, durations of the low-power modes are adaptively varied. In one embodiment, the durations of the tracking phases, and tracking/acquisition phases are adaptively varied.

In one embodiment, the duration of the next low-power mode is adaptively varied in accordance with estimated velocity or acceleration of the GNSS receiver. In one embodiment, the duration of the next low-power mode is adaptively varied in accordance with a time elapsed since a prior determination of the position of the GNSS receiver. In one embodiment, the duration of the next low-power mode is adaptively varied in accordance with a temperature drift of the GNSS receiver since a prior determination of the position of the GNSS receiver. In one embodiment, the duration of the next low-power mode is adaptively varied in accordance with a quality of a GNSS satellite received since a prior determination of the position of the GNSS receiver. In one embodiment, the duration of the next low-power mode is adaptively varied in accordance with a model characterizing the behavior of a user of the GNSS receiver.

In one embodiment, the GNSS receiver is disposed in a device that also includes the control unit. In one embodiment, the control unit is a software module. In one embodiment, the control unit is a hardware module. In one embodiment, the control unit includes both software and hardware modules.

A method of operating a GNSS receiver having disposed therein a position calculation and reporting module as well as a tracking and acquisition module includes, in part, causing the GNSS receiver to enter a low-power mode following each acquisition phase and/or each tracking/acquisition phase, causing the GNSS receiver to exit the low-power mode in response to instructions from a control unit to calculate a position of the GNSS receiver wherein the position of the GNSS receiver is calculated and reported only in response to instructions from the control unit, and causing the GNSS receiver to enter the low-power mode after calculating and reporting the position of the GNSS receiver.

In one embodiment of the method, if a duration of a low-power mode is such that an estimate of a corresponding local clock drift is detected as being less than a threshold value, only tracking operation is performed after exiting the low-power mode. If the duration of the low-power mode is such that the estimate of a corresponding local clock drift is detected as being greater than or equal to the threshold value, both acquisition and tracking operations are performed after exiting the low-power mode.

In one embodiment, the method further includes, in part, selecting between a normal acquisition phase and a low-power acquisition phase. During the low-power acquisition phase, a narrower range of frequency bins and code offsets is searched to reacquire satellite signals. In one embodiment, durations of the low-power modes are adaptively varied. In one embodiment, the durations of the tracking phases, and tracking/acquisition phases are adaptively varied.

In one embodiment of the method, the duration of the next low-power mode is adaptively varied in accordance with estimated velocity or acceleration of the GNSS receiver. In one embodiment of the method, the duration of the next low-power mode is adaptively varied in accordance with a time elapsed since a prior determination of the position of the GNSS receiver. In one embodiment of the method, the duration of the next low-power mode is adaptively varied in accordance with a temperature drift of the GNSS receiver since a prior determination of the position of the GNSS receiver. In one embodiment of the method, the duration of the next low-power mode is adaptively varied in accordance with a quality of a GNSS satellite received since a prior determination of the position of the GNSS receiver. In one embodiment of the method, the duration of the next low-power mode is adaptively varied in accordance with a model characterizing the behavior of a user of the GNSS receiver.

In one embodiment, the GNSS receiver is disposed in a device that also includes the control unit. In one embodiment, the control unit is a software module. In one embodiment, the control unit is a hardware module. In one embodiment, the control unit includes both software and hardware modules.

DETAILED DESCRIPTION OF THE INVENTION

In accordance with one embodiment of the present invention, a GNSS system operates intermittently and has adaptive activity and sleep time in order to reduce power consumption. In accordance with another embodiment of the present invention, the GNSS system provides an enhanced estimate of its position in the absence of GNSS signals of sufficient strength. In accordance with yet another embodiment of the present invention, the user's activity and behavior is modeled and used to improve performance, response time, and power consumption of the GNSS system. The user model is based, in part, on the received GNSS signals, as it may show whether the user is indoor or outdoor, a history of the user's positions, velocity, time, and inputs from other sensors disposed in the GNSS system, as well as data related to the network. The users' estimated situation and anticipated needs, for example, going from indoor to outdoor, may also be used to improve performance, response time, and power consumption of the GNSS system. For example, embodiments of the present invention estimate that the user is indoor or is moving indoor (using the receive signal strength) so as to make the GNSS ready to retrigger acquisition when the user needs a new position fix, for example, to geotag a picture. Furthermore, for example, based on history data of the user's position, embodiments of the present invention detect that the user is far from its usual location, e.g. in a leisure trip, and therefore more likely to require position fixes either for navigation or photo geotagging purposes.

In the following it is understood that:

PVT refers to position, velocity and time as provided by a GNSS system, this may also include estimated PVTs based on GNSS signals or other sources of navigation information such as an hybrid position engine calculating position from wireless beacons (e.g. WLAN or cellID) or dead reckoning functionality using MEMs sensors;

GNSS refers to a satellite-based navigation system such as GPS, or other earth-based positioning/navigation system such as cooperative positioning;

GNSS time refers to absolute time which is synchronous with the time provided by the GNSS system;

Pseudo-range refers to the estimated distance from a GNSS system to a particular satellite based on estimated GNSS time;

Available satellite refers to a satellite or any source of navigation signals whose signal strength is sufficient for the GNSS system to lock to;

Sleep mode refers to any mode in which power consumption is reduced, such as when the GNSS system enters into a quiescent or partially quiescent state;

Fix refers to the determination of PVT which can be done with varying degrees of accuracy.

Figure 1A:
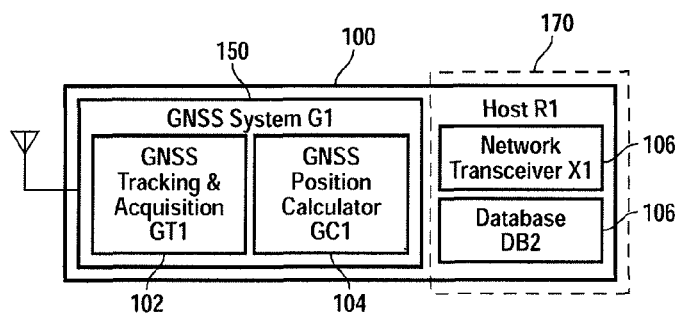
FIG. 1A is a block diagram of a device that includes a GNSS receiver and a communication/processing unit, in accordance with one exemplary embodiment of the present invention.
Figure 1B:
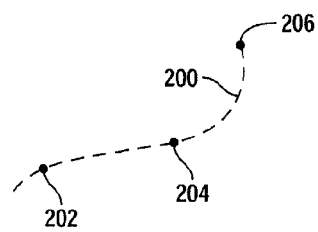
FIG. 1B is an exemplary path assumed to have been taken by the GNSS receiver of FIG. 1A.

Code Offset generally refers to the Satellite code that are used to acquire and enter into a tracking loop FIG. 1A is a block diagram of a device 100 that includes a GNSS receiver 150 and a control unit 170, in accordance with one exemplary embodiment of the present invention. GNSS receiver 150 is shown as including a GNSS tracking and acquisition component 102, and a GNSS position calculator 104. Control unit 170 is shown as including a network transceiver 106, and a database 108. FIG. 1B is an exemplary path 200 assumed to have been taken by GNSS 100. Each of the points 202, 204, and 206 along path 200, has an associated position/velocity/time (PVT). Furthermore, associated with each of the points 202, 204, and 206 is a multitude of pseudocodes each of which corresponds to a different satellite.

While operating in the intermittent mode, GNSS receiver (alternatively referred to herein as GNSS) 150 performs acquisition and tracking of GNSS satellites when GNSS receiver wakes up from a sleep mode. The wake-up period may vary as described further below. When operating in the intermittent mode, GNSS 150 performs position calculation or reporting only when requested to do so by control unit 170.

Figure 2A:
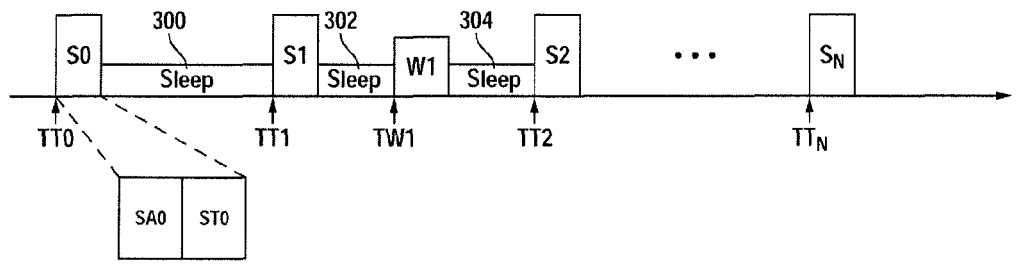
FIG. 2A is an exemplary timing diagram of acquisition phase, tracking phase, position calculation phase, and sleep phase of the GNSS receiver of FIG. 1A, in accordance with one exemplary embodiment of the present invention.

FIG. 2A is an exemplary timing diagram of acquisition phase, tracking phase, position calculation phase, and sleep phase of the GNSS receiver of FIG. 1A, in accordance with one exemplary embodiment of the present invention. In FIG. 2A, GNSS 150 is shown as waking up at times $TT_0$, $TT_1$, $TT_2$ ... $TT_N$ to perform acquisition and tracking The time slots associated with $TT_0$, $TT_1$, $TT_2$ ... $TT_N$ are identified in FIG. 2A as $S_0$, $S_1$, $S_2$, and $S_N$. After expiration of each acquisition and tracking time slot, GNSS 150 enters into sleep mode while attempting to maintain synchronization with GNSS satellites. In response to a query from control unit 170, GNSS position calculator 104 calculates the position of device 100 based on the estimates from previous measurement and reports the calculated position to the device 100. Position calculator 104 of GNSS receiver 150 may also calculate the position of GNSS receiver 150 after each acquisition/tracking cycle but not supply the calculated position to control unit 170 unless instructed to do so by control unit 170.

In FIG. 2A, a query is shown as being made by control unit 170 at $T_{W1}$. The time slot associated with time $T_{W1}$ is shown as $W_1$. Accordingly, during time slot $W_1$, position calculator 104 calculates the position of device 100 using data collected during period $S_1$.

Acquisition Mode

As shown in FIG. 2A, GNSS 150 is adapted to attempt to maintain synchronization with GNSS satellites while saving power by entering a low-power sleep mode following each acquisition and tracking period. Three such sleep periods, namely 300, 302, and 304 are shown in FIG. 2A. Each time slot $S_i$, where i is an integer varying from 0 to N, has both an acquisition phase $SA_i$, and a tracking phase $ST_i$, or only a tracking phase $ST_i$. FIG. 2A shows the acquisition phase $SA_0$ and tracking phase $ST_0$ associated with time slot 0. Although not shown, it is understood that each of the other time slots also has a tracking phase. Furthermore, although not shown, if the duration of a sleep time following time slot i is relatively small and the level of the corresponding local clock drift during this sleep time can be compensate for, then the next activity time slot (i+1) only includes a tracking phase and no acquisition phase. Accordingly, during each activity period (slot time) either (i) both acquisition and tracking are performed (acquisition/tracking), or (ii) only tracking is performed.

Normal acquisition mode includes searching a standard set of frequency bins and code offsets to determine the frequency offsets (due to, e.g. Doppler shift) and code offsets for each satellite. Low-power acquisition includes searching within a narrower range of frequency bins and code offsets to reacquire satellites. A narrower search range allows faster acquisition, which results in lower power consumption and faster acquisition fix.

GNSS 150 is adapted to operate either in normal acquisition mode or low-power acquisition mode. Selection between these two modes depends on a range of factors, such as (i) velocity or estimated acceleration of device 100 (for example, if Doppler shift due to receiver acceleration is larger than a threshold then low-power acquisition mode cannot be used and normal acquisition mode is required), (ii) time elapsed since last fix (for example, if time elapsed from last fix exceeds a threshold, then the same satellites as those used in the last fix might not be visible any more and the GNSS receiver needs to switch to normal acquisition to acquire new satellites in order to obtain a PVT fix), (iii) measured temperature drift since last fix (for example, if temperature variations are relatively large, it's likely that the local GNSS receiver clock needs to be recalibrated thus requiring acquisition mode, and if temperature is relatively constant and sleep time is relatively small, then no acquisition would be needed and tracking would be sufficient), (iv) estimated quality of the satellite channels (for example, if Doppler shift due to receiver acceleration is larger than a threshold, then low-power acquisition mode cannot be used and normal acquisition is required), and (v) model of the user (if, for example, the user is detected to be indoors, GNSS receiver can switch between long sleep times and low power acquisition mode to determine whether user moves to outdoors).

Tracking Mode

The tracking mode of operation, which happens during each time slot $ST_i$, is described below with reference to FIGS. 2A and 2B. During the sleep period, the GNSS receiver is no longer in communication with the GNNS satellites and thus can lose synchronicity with the GNSS satellite system clock. If, at the end of an acquisition/tracking time slot, e.g. time slot $S_0$, the GNSS receiver determines that the quality of the received GNSS signal is high (e.g., the signal strength is above a threshold value), then during the subsequent time slot $S_1$ when the GNSS receiver wakes up, the GNSS receiver can resynchronize its clock with the GNSS clock using a low-power acquisition mode; this in turn enables the sleep period between the time slots $S_0$ and $S_1$ to be relatively long. If, on the other hand, at the end of an acquisition/tracking time slot, e.g. time slot $S_0$, the GNSS receiver determines that the quality of the received GNSS signal is low (e.g., the signal strength is below a threshold value), then during the subsequent time slot $S_1$ when the GNSS receiver wakes up, due to the high probability that the received GNSS signal is weak, the GNSS receiver will be unable to acquire the GNSS clock. Accordingly, in such cases the GNSS receiver performs a tracking operation, which in turn requires a sufficiently good estimate of the size of the GNSS receiver clock drift during the intervening sleep period in order to allow the GNSS receiver to compensate for the clock drift during the next wake-up cycle. Accordingly, when the received GNSS signal is relatively strong signal, relatively long sleep time and low power acquisition may be used. When the received GNSS signal is relatively weak, relatively short sleep time and tracking (along with clock drift estimation scheme) may be used. Acquisition followed by tracking in the same time slot is performed when the received GNSS signal is moderately weak and the user behavior indicates that a relatively long sleep time can be tolerated (such as when the user is indoor, or is not moving). In such cases the subsequent active period will include low power acquisition followed by tracking if acquisition is successful.

To achieve resynchronization using the tracking mode of operation, the code offsets $PC_{ij}$ (index j identifies the satellite) for each available satellite is obtained from the satellite. The Doppler shift associated with each $PC_{ij}$ is also estimated given the knowledge of GNSS satellite orbital information, thereby to enable the estimation of the velocity of device 100. The quality of the signal received from each satellite is also determined, as described above. The Doppler shift associated with each $PC_{ij}$, the estimated value of the clock drift while in the sleep mode at any given temperature (to calibrate the local GNSS receiver clock and the sleep clock) and the estimated quality of the signal from each satellite is subsequently used to estimate the time $TT_{i+1}$ (for tracking time slot $ST_{i+1}$) which defined the next sleep period. One technique for achieving this is to make $TT_{i+1}$ inversely proportional to the Doppler shift of the GNSS system, and directly proportional to the signal quality. According to such a technique, the slower the GNSS receiver moves, the longer the time elapsed between successive time slots becomes. Likewise, the higher the signal quality, the longer is the time elapsed between the time slots. The estimated Doppler shift associated with each $PC_{ij}$, the estimated quality of the signal for each satellite, and the estimated time $TT_{i+1}$ for tracking time slot $ST_{i+1}$ are used to estimate the code offset $PC_{i+1,j}$ associated with time $TT_{i+1}$. In other words, the estimated $TT_{i+1}$ defines the duration of the next sleep cycle, which in turn, enables the GNSS receiver to determine the size of the clock drift during the next sleep cycle. The size of this clock drift enables the GNSS receiver to estimate the code offset $PC_{i+1,j}$ during the next wake-up cycle $TT_{i+1}$. The estimated code offset $PC_{i+1,j}$ enables the GNSS receiver to lock into and track the satellites.

Operating in tracking mode enables the GNSS system to quickly resynchronize with the satellites and obtain a position fix whenever necessary, while consuming much less power than conventional systems which use the pseudo-range information to calculate position fixes on a continuous basis.

Adaptive Activity Time

A GNSS system adapted to intermittently measure, calculate and report position, in accordance with the present invention, may change the rate at which it conducts this activity, i.e., the sleep period, depending on the user model as described below, GNSS signal conditions, or inputs from network devices, or information provided by sensors so as to reduce frequency and duration of measurement, calculation and tracking activity, and the like.

In one embodiment, as described in detailed above, tracking is performed intermittently. In one embodiment, low-power acquisition is performed when signal conditions and user model, described below, indicate easy acquisition. For example, when the GNSS receiver determines that the strength of the satellite signal received during a time slot is high, the succeeding sleep duration may be set to a relatively high value. In one embodiment, time synchronization is performed using a limited number of satellites and knowledge of current estimated time as well as prior PVT history. To achieve this, only satellite orbital information and velocity estimates are used to track a limited number of satellites to aid in maintaining synchrony with the GNSS time. This may be achieved with as few as one satellite. The desired position accuracy defines the tracking period. For example, the tracking time used when the desired position accuracy is 5 meters is higher than the tracking time used when the desired position accuracy is 100 meters. Accordingly, the adaptive active time can vary both the sleep period as well as the duration of the time slots during which acquisition/tracking operations are performed.

In one embodiment, the GNSS receiver wakes up to perform any one of acquisition, tracking, PVT calculation, or a combination of such activities when the device in which the GNSS receiver is disposed changes state in response to any number of events. A change in the state of the device is detected when, for example, the device is powered up or powered down. A change in the state of the device is detected when, for example, sensors disposed in the device detect motion, or detect no motion for a known period of time, or detect acceleration, or detect no acceleration for a known period of time, or detect user contact and/or handling, or detect no user contact and/or handling for a known period of time, or detect an ambient audio level, or detect a pre-set or recurring alarm, or detect a relatively large temperature drifts. As described above, code offsets PCij values may be used, as described above, to relatively quickly estimate the position of the GNSS receiver and provide the result to the device in which the GNSS receiver is disposed.

When a host requests that its position be promptly determined, the GNSS system performs calculations on pseudo-codes obtained during the previous acquisition or using the last calculated PVT fix and tracking time slot to report its position. In this mode, the GNSS system reports its estimated position when polled, even before it acquired satellite signals. This may occur when the device is in a low-power mode such as a sleep mode. The GNSS system also reports an accuracy estimate based on, for example, the last time to fix and estimated velocity given then a range of possible location (centered around the last known position), as described further below.

Extrapolated Position Reporting

After waking up from a lower-power or sleep mode, the last stored pseudo-codes are used to calculate a PVT. Because this PVT corresponds to pseudo-codes obtained at an earlier time, a degree of uncertainty will be associated with this position. The uncertainty associated with the position is reported as being proportional to the time elapsed since the pseudo-codes were first obtained, as well as to the Doppler values obtained from the last know code offsets PCij.

Figure 2B:
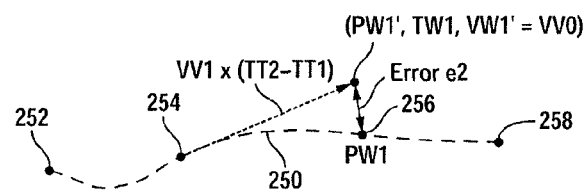
FIG. 2B is another exemplary path assumed to have been taken by the GNSS receiver of FIG. 1A.

FIG. 2B shows an exemplary path 250 traveled by a GNSS system. Points 252, 254 and 256 show actual points passed by the GNSS system as it travels along path 250. Assume that device 100's speed changes between the times $TT_1$ and $TT_2$, and that at time $TW_1$ device 100 makes a query to GNSS position calculator 104 to determine its position. The time slot during which position determination is made is shown as $W_1$. Assume further that during this query no GNSS signal is detected due to, for example, entry into a building by the user of the GNSS system. The position at time $TW_1$ is estimated using the last known velocity of device 100 and the time difference $(TW_1-TT_1)$. The difference between the actual position $PW_1$ and the estimated position $PW'_1$ is shown in FIG. 2B as error E2. The larger is the velocity of the GNSS system, the larger is error E2. In some other embodiments, position determination is made using last known position and velocity values even when GNSS signals are readily detected and can be acquired. In yet other embodiments, if no GNSS signals can be acquired, the GNSS system may, if it has information about a structure that is closest to $PW'_1$, report the address of this structure and work under the assumption that the GNSS system is located within the structure.

Post-Processing Position Data

At times, even a best-effort fix may result in unacceptably high errors in PVT. In accordance with the present invention, the accuracy of the PVT data is improved after initial calculation of the position. For example, the accuracy of the PVT data associated with a picture taken by a camera that has a resident GNSS system is improved retroactively after the picture is taken. This improvement can be obtained by using PVT fixes with greater certainty, obtained at times preceding and following the time of the uncertain fix. For example, a multitude of accurate PVT estimates obtained in a sequence and spanning a time period $T_{span}$ are used to estimate PVTs for times that fall within $T_{span}$, as described further below. Alternatively, a host may Geotag using an uncertain PVT fix, and subsequently obtain an improved PVT fix at a later time. The device may retroactively update the uncertain PVT fix with the improved PVT data.

User Models

In accordance with the present invention, a GNSS system is adapted to substantially improve its usability and performance by anticipating how a user will operate it. To achieve this, the user's current state and transitions to other states over time are modeled. Herein such states and transitions are referred to collectively as user model or user behavior.

Embodiments of the present invention provide methods and systems for determining and applying a user model in the context of GNSS and position systems, as well as for communication devices in general. In one example, the following factors are used in developing the user model:

1. Whether the user is indoors, based on trajectory into an edifice or other covered structure. This is achieved by looking at the signal strength. Acquisition fails if no Satellites are visible. Under such conditions, the GNSS receiver assumes that the user is indoor and perform periodic wake-up and re-acquisition:
   (i) Similarly, determine if the user has just departed an edifice. If a periodic wake-up is successful, it indicates the user is now outdoor.
   (ii) Determine approximate user position from transceiver xl based on a network address or similar information using hybrid location engine and wireless positioning methods
   (iii) Utilize map data available from database 108 or transceiver 106, as well as sudden changes in GNSS signal availability. If the device has an embedded map, it is then possible to process the map and spate what is "indoor" versus "outdoor". The GNSS receiver uses this as an indication.
2. Whether the user is in an area with difficult GNSS reception:
   (i) Determined from GNSS signal conditions obtained during tracking/acquisition using the same techniques described in No. (1)
3. What kind of vehicle or mode transportation the user is in:
   (i) Determine this based on data from database 108 or transceiver 106. This is achieved using velocity calculated during the previous fix. If velocity is relatively high, then the sleep time is made short because the user can cover a great distance in a limited time (in a train for instance). However if the velocity is relatively low, then the sleep time is longer (e.g., walking) The time is then tied to an accuracy index that the user choose. If the product of velocity and time is greater than the accuracy index or the tolerated error, then a new fix is needed, if not, it is skipped.
4. What route identification the user is on, e.g. flight number, bus route, train line:
   (i) Utilize information about what station, gate or platform the user is on, based on historical PVT fix information and extrapolated trajectory, in conjunction with information from database 108 or transceiver 106. If from the map, the GNSS determine that the user is on a "hub" like an airport, then it can take the decision to go to sleep and do a late re-acquisition because supposedly the user will take a flight. Accordingly, the map data is used in order to estimates when the user will need to know its position accurately.

5. What kind of road the vehicle is on: city or highway:
   (i) Use velocity and acceleration as well as data from database 108 or transceiver 106. Map information is used to anticipate if the receiver may be at rest or needs to actively track position. Approaching a known tourism site will need accurate fixes. However cruising at constant speed on a freeway may not.
6. What kind of traffic the user is in:
   (i) Use acceleration or information from transceiver 106. Map information is used to anticipate if the receiver may be at rest or needs to actively track position. Approaching a known tourism site will need accurate fixes. However cruising at constant speed on a freeway may not.
7. What kind of travel is the user engaged in: routine commute or new location, business travel or tourism. Map information is used to anticipate if the receiver may be at rest or needs to actively track position. Approaching a known tourism site will need accurate fixes. However cruising at constant speed on a freeway may not:
   (i) Utilize current time, position, and historical data stored in database 108 or obtained via transceiver 106.
   (ii) If it is a new location, utilize recent application activity (e.g. a history of pictures taken recently) to determine the likelihood of application activity as the user changes states, e.g. approaches a destination.
8. Likely destination e.g. tourism destination, hotel:
   (i) Utilize route identification number, as well as tourism information stored in database 108 or obtained using transceiver 106.
9. Whether the user is approaching a location that will require increased activity or accurate fix:
   (i) For example, the user enters the parking lot of a likely tourist destination.
10. Whether the user is departing a roadway, e.g. into a parking lot:
    (i) Utilize map data available from database 108 or transceiver 106.
11. Anticipated temperature drift:
    (i) Utilize known weather from database 108 or transceiver 106
    (ii) Utilize known date/time
    (iii) Departure from an edifice.
    (iv) Temperature sensor historical data and extrapolation.
12. Anticipated user activity such as movement, travel or future destination based on an available calendar:
    (i) Utilize schedule information from another application such as Outlook, or available via transceiver 106 or database 108.

Utilizing a user model containing these elements, as well as transitions among user states, a GNSS system can significantly improve performance and user experience (e.g. accuracy of a fix) while minimizing power consumption.

The above embodiments of the present invention are illustrative and not limitative. Various alternatives and equivalents are possible. Other additions, subtractions or modifications are obvious in view of the present invention and are intended to fall within the scope of the appended claim.

What is claimed is:

1. A GNSS receiver comprising:
   a position calculation and reporting module; and
   a tracking and acquisition module, said GNSS receiver adapted to enter a low-power mode following each tracking phase, or each acquisition and tracking phase, said GNSS receiver being further adapted to exit the low-power mode in response to instructions from a control unit to calculate a position of the GNSS receiver and to reenter the low-power mode after the position of the GNSS receiver is calculated, wherein the position of the GNSS receiver is calculated and reported only in response to instructions from the control unit.

2. The GNSS receiver of claim 1 wherein if a duration of a low-power mode is such that an estimate of a corresponding local clock drift is less than a threshold value, only tracking operation is performed after exiting the low-power mode.

3. The GNSS receiver of claim 2 wherein if a duration of a low-power mode is such that an estimate of a corresponding local clock drift is greater than or equal to the threshold value, acquisition and tracking operations are performed after exiting the low-power mode.

4. The GNSS receiver of claim 1 wherein said GNSS receiver is adapted to select between a normal acquisition phase and a low-power acquisition phase, wherein during the low-power acquisition phase searching within a narrower range of frequency bins and code offsets is performed to reacquire satellite signals.

5. The GNSS receiver of claim 1 wherein durations of the low-power modes are adaptively varied.

6. The GNSS receiver of claim 5 wherein durations of the tracking phases, and tracking/acquisition phases are adaptively varied.

7. The GNSS receiver of claim 5 wherein the duration of a succeeding low-power mode is adaptively varied in accordance with estimated velocity or acceleration of the GNSS receiver.

8. The GNSS receiver of claim 5 wherein the duration of a succeeding low-power mode is adaptively varied in accordance with a time elapsed since a prior determination of the position of the GNSS receiver.

9. The GNSS receiver of claim 5 wherein the duration of a succeeding low-power mode is adaptively varied in accordance with a temperature drift of the GNSS receiver since a prior determination of the position of the GNSS receiver.

10. The GNSS receiver of claim 5 wherein the duration of a succeeding low-power mode is adaptively varied in accordance with a quality of a GNSS satellite received since a prior determination of the position of the GNSS receiver.

11. The GNSS receiver of claim 5 wherein the duration of a succeeding low-power mode is adaptively varied in accordance with a model characterizing behavior of a user of the GNSS receiver.

12. The GNSS receiver of claim 1 wherein said GNSS receiver is disposed in a device comprising the control unit.

13. The GNSS receiver of claim 1 wherein said control unit is a software module.

14. The GNSS receiver of claim 1 wherein said control unit is a hardware module.

15. The GNSS receiver of claim 1 wherein said control unit includes software and hardware modules.

16. A method of operating a GNSS receiver comprising a position calculation and position reporting module, and a tracking and acquisition module, the method comprising:
   causing the GNSS receiver to enter a low-power mode following each acquisition phase, or each tracking/acquisition phase;
   causing the GNSS receiver to exit the low-power mode in response to instructions from a control unit to calculate a position of the GNSS receiver, wherein the position of the GNSS receiver is calculated and reported only in response to instructions from the control unit; and causing the GNSS receiver to enter the low-power mode after calculating and reporting the position of the GNSS receiver.

17. The method of claim 16 wherein if a duration of a low-power mode is such that an estimate of a corresponding local clock drift is less than a threshold value, only tracking operation is performed after exiting the low-power mode.

18. The method of claim 17 wherein if a duration of a low-power mode is such that an estimate of a corresponding local clock drift is greater than or equal to a threshold value, acquisition and tracking operations are performed after exiting the low-power mode.

19. The method of claim 16 further comprising:
selecting between a normal acquisition phase and a low-power acquisition phase, wherein during the low-power acquisition phase searching within a narrower range of frequency bins and code offsets is performed to reacquire satellite signals.

20. The method of claim 16 further comprising:
adaptively varying durations of the low-power modes.

21. The method of claim 16 further comprising:
adaptively varying durations of the acquisition, tracking, and acquisition/tracking phases.

22. The method of claim 20 further comprising:
adaptively varying the duration of a succeeding low-power mode in accordance with estimated velocity or acceleration of the GNSS receiver.

23. The method of claim 20 further comprising:
adaptively varying the duration of a succeeding low-power mode in accordance with a time elapsed since a prior determination of the position of the GNSS receiver.

24. The method of claim 20 further comprising:
adaptively varying the duration of a succeeding low-power mode in accordance with a temperature drift of the GNSS receiver since a prior determination of the position of the GNSS receiver.

25. The method of claim 20 further comprising:
adaptively varying the duration of a succeeding low-power mode in accordance with a quality of a GNSS satellite received since a prior determination of the position of the GNSS receiver.

26. The method of claim 20 further comprising:
adaptively varying the duration of a succeeding low-power mode in accordance with a model characterizing behavior of a user of the GNSS receiver.

27. The method of claim 16 further comprising:
disposing the GNSS receiver in a device comprising the control unit.

28. The method of claim 16 wherein said control unit is a software module.

29. The method of claim 16 wherein said control unit is a hardware module.

30. The method of claim 16 wherein said control unit includes hardware and software modules.

* * * * *